United States Patent [19]

Ford et al.

[11] 3,931,049

[45] Jan. 6, 1976

[54] METHOD FOR PRODUCING A CATALYST

[75] Inventors: James A. Ford, North Haven, Conn.; Sheldon H. Butt, Godfrey, Ill.

[73] Assignee: Olin Corporation, New Haven, Conn.

[22] Filed: Dec. 12, 1974

[21] Appl. No.: 532,071

Related U.S. Application Data

[60] Division of Ser. No. 385,077, Aug. 2, 1973, Pat. No. 3,876,456, which is a continuation-in-part of Ser. No. 342,271, March 16, 1973, Pat. No. 3,810,754.

[52] U.S. Cl............ 252/455 R; 252/459; 252/466 J; 423/213.5
[51] Int. Cl.²............................................ B01J 29/34
[58] Field of Search............. 252/466 J, 465, 455 R; 423/213.5; 204/37 R, 44, 52 R

[56] References Cited
UNITED STATES PATENTS

| | | | |
|---|---|---|---|
| 3,718,733 | 2/1973 | Gehri | 423/213.2 |
| 3,773,894 | 11/1973 | Bernstein et al. | 252/474 X |

*Primary Examiner*—W. J. Shine
*Attorney, Agent, or Firm*—Robert H. Bachman

[57] ABSTRACT

A catalyst for the reduction of automobile pollution and a method for forming the same are described. The catalyst comprises a nickel alloy substrate having specified composition and a surface layer containing from 10 to 50% copper. The copper concentration varies from 10 to 50% at the surface to 0% within the substrate.

9 Claims, 7 Drawing Figures

METHOD FOR PRODUCING A CATALYST

CROSS REFERENCE TO RELATED APPLICATIONS

This case is a division of copending application Ser. No. 385,077 by James A. Ford and Sheldon H. Butt for "Catalyst For The Reduction Of Automobile Exhaust Gases," filed Aug. 2, 1973, now U.S. Pat. No. 3,876,456 which in turn is a continuation-in-part of application Ser. No. 342,271 by James A. Ford and Sheldon H. Butt for "Oxidation Resistant Nickel Base Alloys," filed Mar. 16, 1973, now U.S. Pat. No. 3,810,754.

BACKGROUND OF THE INVENTION

The field of automotive emission controls represents an area which is receiving a great deal of attention, particularly as government regulations concerning automotive pollution become more and more strict. It is now accepted that some sort of catalytic control system will be necessary in order that automobiles may meet future regulations, particularly with regard to emissions of oxides of nitrogen.

Potential catalysts must be evaluated from at least three view points; effectiveness, durability and cost. The catalysts systems proposed in the past have been deficient in one or more of the factors. Noble metal catalysts such as platinum or rhodium are effective and may be long lasting but they are extremely expensive while non-noble metal catalysts such as certain nickel base, stainless steel, and copper base alloys have not shown themselves to be durable enough for commercial use.

SUMMARY OF THE INVENTION

The present invention consists of a catalyst for use in a reduction of automotive pollution and a method for fabricating catalysts.

The catalysts described in the present application possess a unique combination of effectiveness, durability and low cost. The catalysts of the present invention comprising a nickel base alloy substrate having extreme resistance to high temperature oxidation, nitridation and sulfidation, and a metallic layer on the surface of the substrate which comprises a nickel-copper alloy containing alloy constituents which increase its oxidation resistance.

It is a primary object of the present invention to provide a highly effective catalyst for the reduction of oxides of nitrogen.

It is a further object of the present invention to provide a low cost catalyst for use in automotive pollution control systems.

Yet another object of the present invention is to provide a highly durable non-noble metal catalyst for the reduction of pollution.

DESCRIPTION OF THE DRAWINGS

FIG. 1 includes a graph showing the concentration of copper as a function of depth below the surface of the catalyst.

DESCRIPTION OF THE PREFERRED EMBODIMENTS

Past research has demonstrated that alloys containing 50 to 90% nickel and 10 to 50% copper are effective catalysts. However, catalysts formed of nickel-copper alloys have been found to be subject to degradation during use and consequently have not been practical for use in long term applications. The observed degradation is a combination of surface and internal oxidation which occurs during use. Past attempts to overcome this problem include the application of a copper or a nickel-copper layer to the surface of an oxidation resistant substrate. These attempts have been unsuccessful because the surface layer is still subject to oxidation and is not in any way protected by the oxidation resistant substrate. The ordinary substrate degrades by unusual internal oxidation when coated with copper or nickel-copper alloys. An additional observed effect is that during the high temperature exposure encountered during use the copper of the surface layer tends to diffuse into the substrate, thereby locally diluting the substrate and rendering it subject to oxidation attack. The preceeding discussion has dealt with the oxidation problem. In an actual operating situation there is also a form of attack due to the presence of sulfur and nitrogen in the exhaust gases. Past attempts which use a clad substrate material have generally been unsuccessful in resisting sulfidation and nitridation attack for the same reasons that they have failed to resist oxidation attack.

Figure 1:
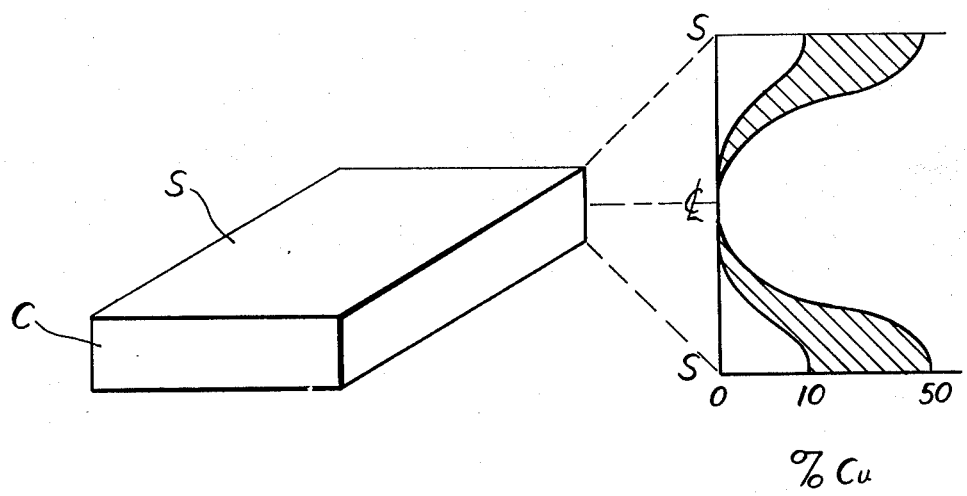
FIG. 1 shows the composite catalyst to the present invention, in its final form after heat treatment.

The composite catalyst of the present invention, as shown in FIG. 1, overcomes these difficulties by providing an oxidation resistant substrate C containing alloying constituents which may diffuse into the surface layer during use thereby increasing the oxidation resistance of the surface layer while simultaneously protecting areas of the substrate which have become copper rich by diffusion of the surface layer into the substrate.

The oxidation resistant substrates used in the past have generally relied upon the presence of chromium for oxidation resistance for example, stainless steels and Nichrome and various nickel, iron and chromium alloys. Chromium, however, is extremely insoluble in pure copper and in nickel-copper alloys. The oxidation resistant substrate of the present invention comprises a nickel base alloy containing aluminum and silicon and optionally containing chromium. The solubilities are given in Table I.

TABLE I

| Solid Solubilities of Elements in Copper | | |
|---|---|---|
| at 500°C | at 800°C | at 1000°C |
| Aluminum 19 | 17 | 16 |
| Silicon 9 | 4 | 4 |
| Chromium .05 | .1 | .45 |

The increased solubility of these elements in copper as compared with chromium, indicates that they are better able to protect the copper containing outer layer of the catalyst as well as the copper rich areas of the substrate from damaging oxidation and sulfidation.

The broad composition of this alloy substrate of the present invention is from 2 to 6% aluminum, from .5 to 4% silicon, from .001 to 6% chromium, from .001 to 0.4% manganese, from .001 to 1% magnesium, with the balance being nickel. The chromium addition serves mostly to increase the integrity and the oxidation-sulfidation resistance of the substrate, and it contributes little if anything to the oxidation-sulfidation resistance of the surface layer. The manganese eliminates the tendency which nickel base alloys have to crack during hot rolling and the magnesium serves as a deoxidizing agent. A preferred composition range for the substrate is from 3 to 5% aluminum, from 1.5 to 3.5% silicon, from 2 to 5% chromium. Alloys falling within this composition range possess a particularly desirable combination of oxidation resistance, sulfidation resistance, and high temperature mechanical properties.

The metallic surface layer of the catalyst of the present invention, in its final form, contains from 10 to 50% copper, from 50 to 90% nickel, preferably from 20 to 40% copper and from 60 to 80% nickel, from 0.01 to 8% aluminum, from 0.01 to 6% silicon, from .001 to 6% chromium, from .001 to 0.4% manganese and from .001 to .1 magnesium. Because of the possibility that chromium may impair the efficiency of the catalyst, the maximum chromium level is preferably .1%. The final surface composition is controlled by the diffusion of the substrate constituents into the surface layer. FIG. 1 shows, in schematic form, the variation of copper concentration with depth below the surface S of the finished catalyst.

Figure 2:
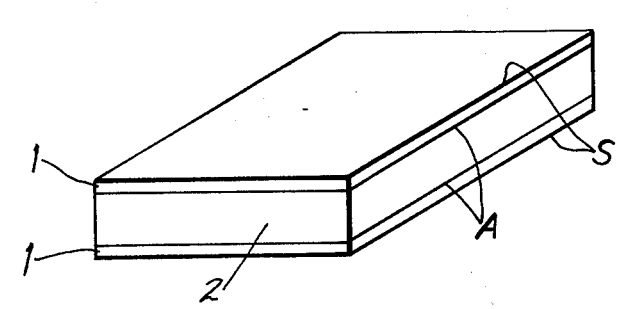
FIG. 2 shows an intermediate step in the production of the catalyst of the present invention showing the substrate and surface layers before the heat treatment step.
Figure 3:
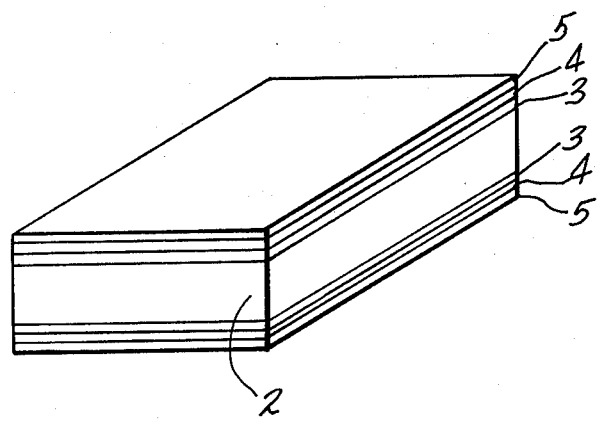
FIG. 3 shows another possible form of intermediate step in the process of the present invention, showing a substrate layer, and with multiple metallic layers on the surface.

The surface layer may be applied in a variety of different ways. For example, a layer of copper may be electroplated on the nickel base alloy substrate. Conventional electroplating techniques may be used with the thickness of the coating being from 1,000 A to .1 inch. FIG. 2 shows copper plate layers 1 applied to the edges of substrate 2. If a layer of pure copper 1 is applied to the surface A of the substrate 2, for example by electroplating, the substrate 2 and the copper coating 1 must be heat treated at a high temperature so that the composition of the surface S falls within the limits previously cited. This change in surface composition is due to inter-diffusion between the nickel substrate 2 and the copper surface layer 1. The temperature of this heat treatment will fall between 750° and 1,050°C and the time of the treatment will be from 5 minutes to 4 hours. The heat treatment process may be performed in an atmosphere neutral or reducing to nickel. The time and temperature required for the heat treatment is largely dependent upon the thickness of the copper layer 1. The correct time temperature combination may be calculated through the use of diffusion data and equations. As an alternative to plating one relatively thick copper layer 1 on the surface A of the substrate 2, a series of layers of metal may be plated on the surface of substrate 2 for example a layer of copper 3, a layer of nickel 4, and a layer of copper 5 may be plated on the surface of the substrate 2 in the order given as shown in FIG. 3. This technique has the advantage of permitting a thicker layer of surface material to be formed, by diffusion, having the desired nickel-copper ratio of 50–50 to 90–10, however the surface layers 3, 4, 5 generally will still be thin enough to permit diffusion of the protective alloying elements from within the substrate 2. The total thickness of the surface layers will be from 1,000 A to .1 inch.

Other techniques may be used to form the surface layer 1 on the substrate 2. An example is the use of a technique such as plasma spraying of metal powder onto the surface of the substrate 2. Another practical technique consists of vapor deposition of the surface layer 1 on the substrate 2 in a vacuum. Any technique resulting in adherent layer of the correct thickness and composition may be used.

Figure 4:
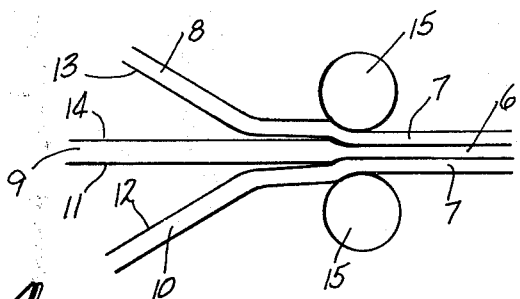
FIG. 4 shows in schematic form, the production of a composite catalytic material by a pressure welding process.

Yet another method by which the surface layer may be applied is by pressure welding strips of metal together, as shown in FIG. 4, to form a composite material having a central core of nickel alloy substrate 6 material and having layers of catalytic material 7, 7 integrally bonded to the major surfaces of the substrate. The pressure welding process is a comparatively simple one in which the strips of metal 8, 9, 10 are arranged so that the major surfaces 11, 12, 13, 14 of the strips come in contact with each other with the surfaces which are in contact having been mechanically or chemically cleaned. The strips of metal are then subject to welding by pressure for example by passing them through a rolling mill 15 so that the strips of metal 8, 9, 10 are bonded together. In the case of the present invention the central core 6 would be composed of nickel base alloy containing silicon, aluminum and optionally containing chromium and the surface layers 7, 7 would be composed of copper, or nickel-copper alloy of the desired composition. Representative patents which describe the pressure welding process are U.S. Pat. Nos. 3,397,045 and 3,634,926, both issued to Joseph Winter.

Regardless of the technique used to apply the surface layer of copper, or nickel-copper alloy of the desired composition, the thickness of the layer should be within the limits cited previously in regard to electroplating, from 1,000 A to .1 inch so that the heat treatment process may be performed in a reasonable amount of time.

After the surface layers have been applied and the heat treatment step performed, the composite may be oxidized to form the catalytic layer. The oxidation process may be performed over a wide temperature range. It is preferred that the oxidation be performed at a temperature of between 200° and 600°C for a time period of from 1 minute to 2 hours. The thickness of the oxide layer formed in this manner will be from 100 A to 1,000 A. Alternatively, the oxidation step may be performed in situ by exposure to exhaust gases during use.

The preceeding discussion has assumed that it would be desirable to form a catalytic surface on both sides of the substrate 2. Of course this may not always be true, for example it may be desirable to fabricate a muffler shell with an internal catalytic surface. In this case it would not be necessary to plate both sides of the substrate.

The composition catalyst of the present invention may be formed into a large variety of mechanical shapes depending upon the desired application. It is desirable that the catalyst have a high ratio of surface area to mass. A particularly desirable physical form for the catalyst is a form known as expanded mesh.

Figure 5:
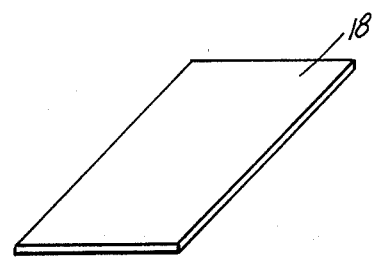
FIG. 5 shows a blank from which expanded metal mesh may be made.
Figure 6:
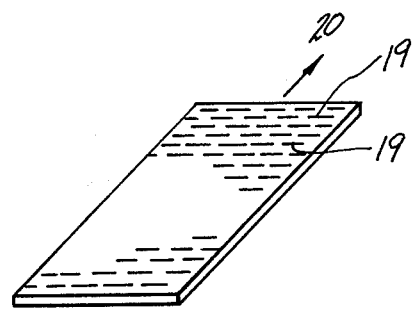
FIG. 6 shows the blank of FIG. 5 after it has been slit.
Figure 7:
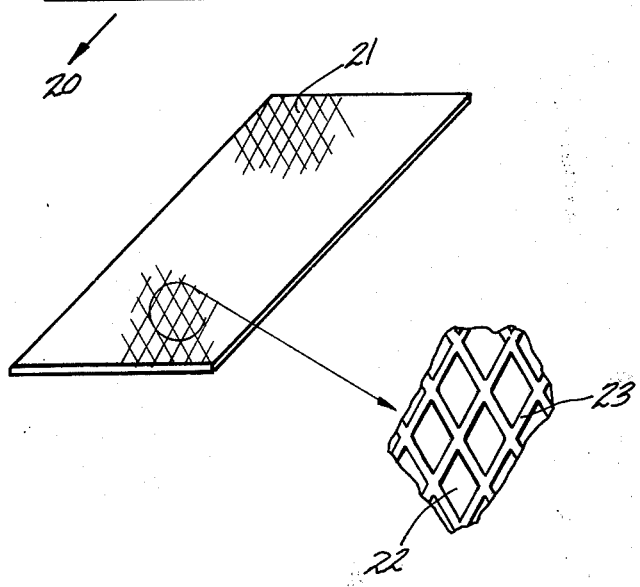
FIG. 7 shows expanded mesh which has been produced from the slit blank shown in FIG. 6.

FIGS. 5, 6 and 7 show steps in the production of expanded mesh. FIG. 5 shows a strip of metal 18, the raw material from which a strip of metal is produced. A series of slits 19 are punched or cut through the metal strip as shown in FIG. 6. The slits have a length to width ratio upon the order of 10 to 1. The long axis of all the slits are parallel. A tensile force is applied longitudinally along the strip, in a direction perpendicular to the long axis of the slits, as shown by the arrows, 20. The tensile force expands the slits S resulting in a porous mesh 21 as shown in FIG. 7 having a plurality of openings 22, defined by metal strips 23. The use of an expanded mesh form for the catalyst of the present invention has several highly desirable advantages. Expanded mesh has a high ratio of surface area to weight, thereby providing increased catalytic activity per unit weight of catalyst material. Expanded mesh is particularly adaptable for use in applications such as automobile catalytic converters wherein high flow rates of exhaust gases must be maintained. Expanded mesh also has a comparatively low heat capacity relative to its surface area and reaches operating temperature rapidly. Finally, the production of expanded mesh is economical since there is no scrap or waste material produced by the process.

The production of the expanded mesh could be performed at any one of several stages during the production of the catalyst of the present invention, depending upon the method used to apply the surface layer. If the surface layer is applied by a plating process the expanded mesh is preferably produced from the substrate material prior to the plating operation. In this way the entire exposed area of substrate may be coated with the catalytic alloy leading to improved catalytic efficiency.

Of course any form or shape having a high ratio of surface area to volume may be employed. For example, the nickel alloy substrate of the present invention may be formed into particles, short lengths of wire of small strips. These small pieces may then be coated with copper and sintered together during the heat treatment process to form a porous catalytic body. If the small shapes are not sintered together, they may be confined and arranged in such a way that the exhaust gases pass over their surface.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for producing a catalyst comprising the steps of:
    A. providing a nickel alloy substrate, said alloy containing from 2 to 6% aluminum, from 0.5 to 4% silicon and the balance essentially nickel;
    B. applying to said substrate a layer of a surface material of copper or a copper alloy by electroplating, said layer having a thickness of from 1,000 A to 0.1 inch; and
    C. heat treating the substrate-surface layer combination at a temperature of from 750° to 1050°C for from 5 minutes to 4 hours in an atmosphere nonoxidizing to nickel, whereby the surface layer and the substrate interdiffuse so that the ratio of nickel to copper at the surface of the catalyst is from 50-50 to 90-10%.

2. A method as in claim 1 wherein the copper concentration at the surface of the catalyst varies from 20-40%.

3. A method as in claim 1 wherein said nickel alloy substrate contains from .001 to .4% manganese and from .001 to .1% magnesium in addition to the constituents recited in claim 1.

4. A method as in claim 1 wherein the nickel alloy substrate contains from 3 to 5% aluminum.

5. A method as in claim 1 wherein the nickel alloy substrate contains from 1.5 to 3.5% silicon.

6. A method as in claim 1 wherein the nickel alloy substrate contains from 0.001 to 6% chromium.

7. A method as in claim 1 including the steps of heating the heat treated substrate-surface layer combination in an oxidizing atmosphere at a temperature of between 200° and 600°C for a time period of from 1 minute to 2 hours.

8. A method as in claim 1 including the step of forming the substrate into expanded mesh prior to applying the copper alloy layer.

9. A method as in claim 1 wherein the copper layer is formed by electroplating alternate layers of copper and nickel until the desired thickness is obtained.

* * * * *